United States Patent
Mondal et al.

(10) Patent No.: US 9,921,632 B2
(45) Date of Patent: Mar. 20, 2018

(54) PAUSING SCRIPTS IN WEB BROWSER BACKGROUND TABS

(71) Applicant: Qualcomm Innovation Center, Inc., San Diego, CA (US)

(72) Inventors: Shyama Prasad Mondal, San Diego, CA (US); Kevin A. Hart, La Mesa, CA (US); Kulanthaivel Palanichamy, San Diego, CA (US); Devdeep Choudhury, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 52 days.

(21) Appl. No.: 14/796,183

(22) Filed: Jul. 10, 2015

(65) Prior Publication Data

US 2016/0019194 A1    Jan. 21, 2016

Related U.S. Application Data

(60) Provisional application No. 62/026,441, filed on Jul. 18, 2014.

(51) Int. Cl.
*G06F 17/00* (2006.01)
*G06F 9/00* (2006.01)
(Continued)

(52) U.S. Cl.
CPC ............ *G06F 1/32* (2013.01); *G06F 9/45529* (2013.01)

(58) Field of Classification Search
CPC ............ G06F 17/2247; G06F 17/3089; G06F 17/30905; G06F 9/461; G06F 9/48; G06F 9/5038
See application file for complete search history.

(56) References Cited

U.S. PATENT DOCUMENTS

2009/0327947 A1*  12/2009  Schreiner .............. G06F 3/0483
                                                          715/777
2013/0080930 A1*   3/2013  Johansson ......... G06F 17/30058
                                                          715/760
(Continued)

OTHER PUBLICATIONS

Kevin Purdy, "Show Message Counts, Chat Alerts in Your Gmail Favicon," lifehacker.com, Feb. 19, 2009, pp. 1-3.*

(Continued)

*Primary Examiner* — Ariel Mercado Vargas
(74) *Attorney, Agent, or Firm* — Neugeboren ODowd OC/Qualcomm

(57) ABSTRACT

Provided is a method for pausing activities in an internet browser in which a plurality of webpages are open, at least one of the webpages being a background webpage relative to at least one other of the webpages. The method may comprise executing, while the plurality of webpages are open, software scripts on the background webpage. The method may then include analyzing a Document Object Model (DOM) and a rendering tree of a background webpage to discover what software scripts the background webpage runs while in the background, and determining whether the background webpage provides title bar updates. The method may also include periodically pausing, by a background activity suspension component, the execution of the software scripts for a pause duration to conserve power or processing resources, and adjusting the pause duration to be longer or shorter based on characteristics of the software scripts that run on the background webpage.

18 Claims, 9 Drawing Sheets

(51) Int. Cl.
*G06F 1/32* (2006.01)
*G06F 9/455* (2018.01)

(56) References Cited

U.S. PATENT DOCUMENTS

| | | | |
|---|---|---|---|
| 2014/0053059 A1* | 2/2014 | Weber | G06F 17/2247 715/234 |
| 2014/0281858 A1* | 9/2014 | Yi | G06F 17/2247 715/205 |
| 2014/0365794 A1* | 12/2014 | Decker | G06F 1/3246 713/320 |
| 2015/0095758 A1* | 4/2015 | Rossi | G06F 17/30902 715/234 |
| 2015/0095838 A1* | 4/2015 | Rossi | G06F 3/0483 715/777 |

OTHER PUBLICATIONS

Kevin Purdy, "Gmail Puts Unread Message Counts First in Tabs, Title Bars," lifehacker.com, Feb. 25, 2009, pp. 1-2.*

* cited by examiner

PAUSING SCRIPTS IN WEB BROWSER BACKGROUND TABS

CROSS REFERENCE TO RELATED APPLICATIONS

The present Application for Patent claims priority to Provisional Application No. 62/026,441 entitled "PAUSING ACTIVITIES IN BACKGROUND BROWSER TABS TO SAVE POWER" filed Jul. 18, 2014, and assigned to the assignee hereof and hereby expressly incorporated by reference herein.

TECHNICAL FIELD

The present invention relates to computing devices. In particular, but not by way of limitation, the present invention relates to processing of web content on mobile devices including tablets.

BACKGROUND

More and more websites are utilizing ECMAscript-based scripting languages (e.g., JavaScript® or Flash®) in connection with the dynamic content that they host. Additionally, websites increasingly utilize functionality embedded in other types of software code, such as style sheet languages and markup languages. Current websites frequently utilize JavaScript-based content. Internet browsers on computing devices have several components that execute code written in various languages on the processors of these computing devices. For example, sections of JavaScript code are run by a JavaScript engine, which may be realized by a variety of technologies, including interpretation-type engines, HotSpot just-in-time (JIT) compilation (e.g., trace based or function based), and traditional-function-based JIT compilation where native code is generated for the entire body of all the functions that get executed.

JavaScript-based engines compile the scripts at runtime to native code, and then the native code is executed on the processor hardware. As a consequence, a browser that uses a JavaScript-based JavaScript engine compiles and executes each piece of JavaScript code as soon as the code is found while parsing the HTML file. Often, this causes sections of JavaScript code to be executed repeatedly. Other types of software scripts are repeatedly executed by other components of the browser.

An end-user of a computing device commonly opens multiple tabs in a web browser at the same time, but the end-user is generally only active in one or two tabs at a time. Tabs may be left open and run in the background for long periods of time, and because of how the websites are written, they may consume power by continuously executing JavaScript and other types of code (e.g., to recalculate style and layout). These websites may or may not perform useful functions while running in the background. Certain websites update in the background quite frequently. This execution of scripts in background tabs occurs periodically and consumes device resources, including battery and processing power.

As a consequence, improved apparatus and methods that reduce the power required for scripting-language processing in background tabs are desired.

SUMMARY

An aspect of the present disclosure provides a method for pausing activities in an internet browser in which a plurality of webpages are open, at least one of the webpages being a background webpage relative to at least one other of the webpages. The method may comprise executing, while the plurality of webpages are open, software scripts on the background webpage. The method may then include analyzing a Document Object Model (DOM) and a rendering tree of the background webpage to discover what software scripts the background webpage runs while in the background and determining whether the background webpage provides title bar updates. The method may also include periodically pausing, by a background activity suspension component, the execution of the software scripts for a pause duration to conserve power or processing resources, and adjusting the pause duration to be longer or shorter based on the characteristics of the software scripts that run on the background webpage.

Another aspect of the present disclosure provides a computing device with a transceiver to request and receive webpages via a network and a user-viewable display to present content from the webpages to a user. The device may also comprise an internet browser that supports a plurality of open webpages at a time. The internet browser may comprise a DOM and rendering tree analyzer that analyzes whether the background pages actively execute scripts and whether a title bar provides updates. The internet browser may also comprise a background activity suspension component to periodically pause background activity of background webpages for a pause duration and resume the background activity between the pause duration to conserve computing device resources. Additionally, the computing device may comprise a pause timing component to adjust the pause duration to be longer or shorter based on characteristics of the software scripts that run on the background webpage.

Another aspect of the present disclosure provides a non-transitory, tangible processor readable storage medium, encoded with processor readable instructions to perform a method for pausing activities in an internet browser in which a plurality of webpages are open, at least one of the webpages being a background webpage relative to at least one other of the webpages. The method may comprise executing, while the plurality of webpages are open, software scripts on the background webpage. The method may then comprise analyzing a Document Object Model (DOM) and a rendering tree of the background webpage to discover what software scripts the background webpage runs while in the background and determining whether the background webpage provides title bar updates. The method may further comprise periodically pausing, by a background activity suspension component, the execution of the software scripts for a pause duration to conserve power or processing resources, and adjusting the pause duration based on the characteristics of the software scripts that run on the background webpage.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings in which like or similar elements are designated with identical reference numerals throughout the several views, and wherein:

DETAILED DESCRIPTION

Figure 1:
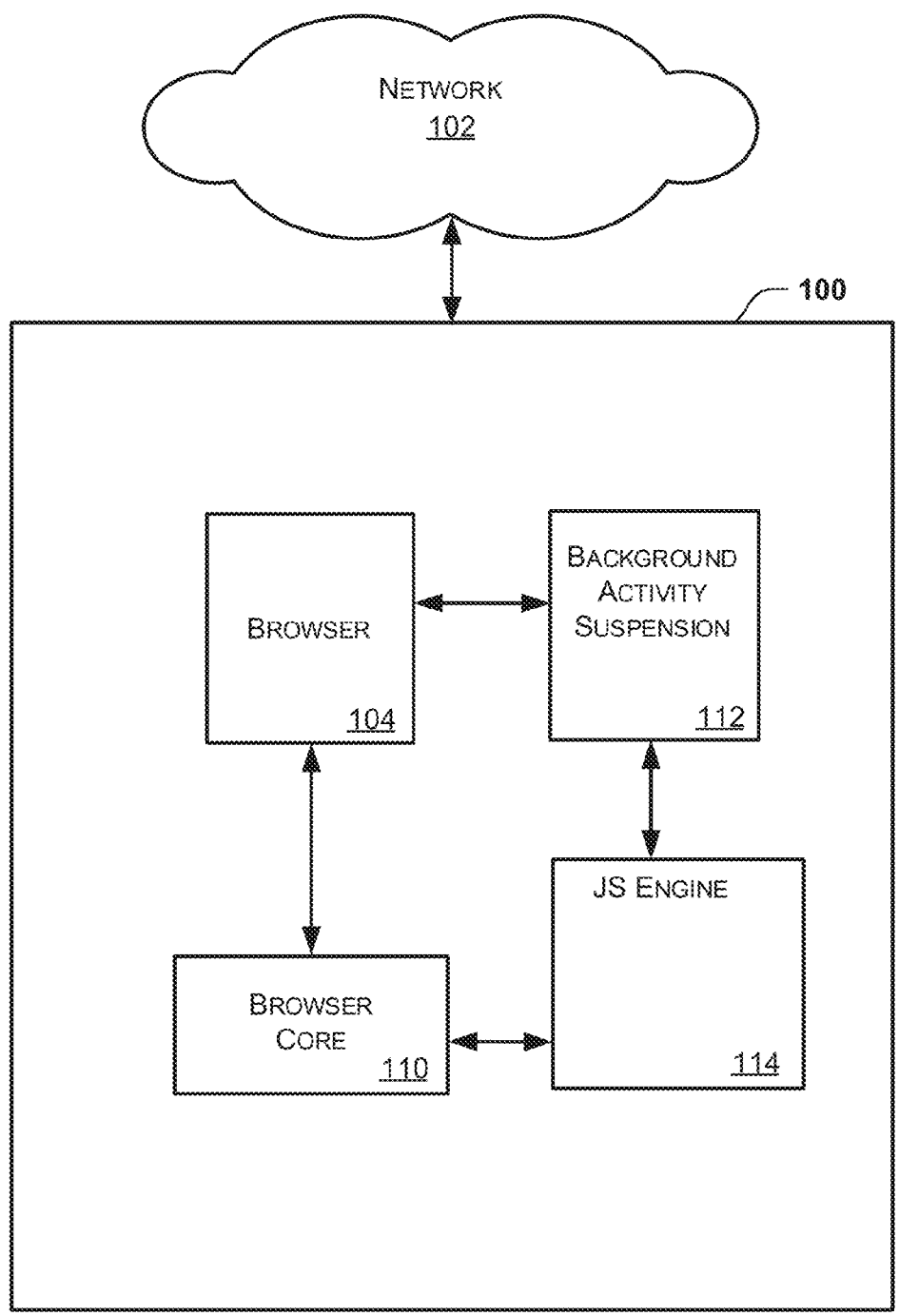
FIG. 1 is a functional block diagram depicting components of a computing device in accordance with aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

Many websites utilize ECMA-based scripting languages to execute dynamic functions. For example, modern websites often have visual features that provide aesthetically pleasing graphics and animations. Websites also include useful functions that allow a user to receive updates about information accessed through the website. Often, these visual or functional features are written in client-side scripting languages, which means that the code used to run the features is executed on the user's computing device. One of the most popular client-side scripting languages is JavaScript®, which is used on nearly every website. Other client-side scripting languages include ActionScript®, Dart®. VBScript®, Typescript®, and Python®. Additionally, many websites run software platforms such as Adobe Flash® and application programming interfaces (APIs) such as Web Audio that further enhance content on the sites. Increasingly, newer versions of style sheet languages such as CSS3 and markup languages such as HTML5 include their own animation functions. Websites written in, or utilizing these languages, software, and APIs require computational power on the user's computing device.

Users of computing devices (such as desktop computers, laptop computers, table computers, and smartphones) are accustomed to opening multiple website tabs in web browsers, and possibly leaving the tabs open for substantial periods of time. Sometimes a user leaves tabs open inadvertently, and simply forgets to close them, and sometimes the user leaves them open for ease of access to the website or certain information generated from the website. Typically, a user has one "current," "main," or "foreground" page open in a particular browser, which, for the purposes of this disclosure, refers to the webpage that is actually displayed or interacted with by the user. Any previously opened webpages that the user has not closed are referred to as "background webpages" (or alternatively, background "tabs," "pages," or "sites"). Aspects of this disclosure may be implemented in any internet browser that supports multiple tabs.

Depending on the environment in which the main and background websites are running, background websites may continue to execute certain dynamic features of the sites that are written in client-side scripting code. Most commonly, JavaScript scripting language code is used to execute these dynamic features, but other previously mentioned client-side scripting languages can be used to execute dynamic functions. Additionally, other programs, languages, or APIs mentioned may execute dynamic functions in the background. For ease of reference, the execution of any software code that results in processing power consumption on a user's computing device will be referred to through the disclosure as "executing scripts." Often, executing scripts requires a recalculation of style and layout which results in an updated visual display to the user. However, other types of script execution can also consume processing power on a user's communication device. Any updated visual display may be seen on the website body itself, or on a title bar, or both. Title bars are typically narrow top sections of a webpage that may be visible in some displays when the webpage is in the background.

In environments where memory, network bandwidth, power consumption, and processing power are not greatly constrained, such as a powerful desktop computer, the execution of scripts in background tabs may not be problematic. A user may be able to keep multiple background tabs open and have the updated information that results from background running scripts readily available, without any noticeable loss in performance on the device or on the browser. However, in different computing environments with more constraints, such as on a smartphone or tablet computer running on a battery, the execution of scripts in background tabs can be costly in terms of battery power, processing power, network data transmission, and memory availability. As a result, many browsers, operating systems, or devices themselves will stop a website from executing any scripts at all when it is in the background, or "kill" the website, leaving only a snapshot (alternatively referred to as a thumbnail or a placeholder) of the website available in the background. Killing background websites can be inconvenient for a user for multiple reasons, including that the website must be completely refreshed when the user decides to go back to it, which may take an undesirable amount of time. Additionally, the functionality of any title bar updates will be broken, and cease to provide updates that the user may have wanted.

In several embodiments, the above-identified problem is addressed by pausing the script execution when a browser tab goes to the background. These embodiments do not pause these activities permanently because permanent pauses would create the same disadvantages as killing a website, which may include causing a user's experience to be compromised. Instead, activities are resumed in a periodic manner so that user still sees the update in a title bar of the background tab whenever required. This is beneficial for the websites where the title bar contains update information that is useful to a user, such as an incoming message, a game score, a social media notification, and other types of updates that will be described throughout the disclosure. Pausing script execution can result in significant power savings. For example, in experiments testing embodiments of the disclosure, power savings of ~15% on top of a ~200 mA baseline have been observed. If the number of background tabs is increased, the savings percentage may increase further.

For convenience, many embodiments and operational aspects of the present invention are described in the context of JavaScript code that is processed by one or more varieties of JavaScript engines that compile JavaScript code, but the methodologies and inventive constructs described herein are certainly applicable to other types of code (e.g., both existing and yet to be developed coding schemes) for executing dynamic functions Referring first to FIG. 1, shown is a block diagram depicting an exemplary communication device 100 in which many embodiments may be implemented. As shown, the communication device 100 is generally configured to communicate via a network 102 to remote web servers or proxy servers (not shown) to receive and display content (e.g., webpages) for a user of the communication device 100. The communication device 100 may be realized by a wireless communications device such as a smartphone, PDA, netbook, tablet, laptop computer and other wireless devices. But the communication device 100 may work in tandem with wireline and wireless communication devices. The network 102 may include the Internet, local area networks, cellular networks (e.g., CDMA, GPRS, and UMTS networks), WiFi networks, and other types of communication networks.

As depicted, the communication device 100 in this embodiment includes a browser 104 that is in communication with a background activity suspension component 112, which is communicatively coupled to the JavaScript engine 114. The background activity suspension component 112 and the JavaScript engine 114 will be described in more detail with reference to later figures. And as shown, a browser core 110 is in communication with the JavaScript engine 114. The illustrated arrangement of the components depicted in FIG. 1 is logical, the connections between the various components are exemplary only, and the depiction of this embodiment is not meant to be an actual hardware diagram; thus, the components can be combined or further separated in an actual implementation, and the components can be connected in a variety of ways without changing the basic operation of the system. For example the JavaScript engine 114 and the background activity suspension component 112 may be closely integrated with the browser core 110.

The browser 104 depicted in FIG. 1 represents high level browser components that carry out operations associated with typical browsers including components that provide a user interface, enable bookmarking and cookie management, and enable a user to open multiple browser tabs, wherein each tab may present a user with a view of a web page. The browser 104 may be realized by a variety of different types of browsers known to those of ordinary skill in the art including Safari, Explorer, Chrome, and Android browsers, and its components will be described in more detail throughout this disclosure.

And as one of ordinary skill in the art will appreciate, the browser core 110 generally operates as a typical browser core to parse, render, and composite webpage content for presentation to the user of the communication device 100. In some embodiments for example, the browser core 110 may be realized by a WebKit browser core, but this is certainly not required and other types of browser cores may be utilized.

The background activity suspension component 112 generally operates, when a tab is in the background, to direct the JavaScript engine 114 and other components of the browser core 110 to periodically suspend the JavaScript and rendering activities associated with background tabs. The background activity suspension component 112 only periodically suspends the JavaScript and rendering activities because, in some cases, background tabs need to update the title bar with information (e.g., to update stock quotes or an indication of a number of newly received emails).

Figure 2:
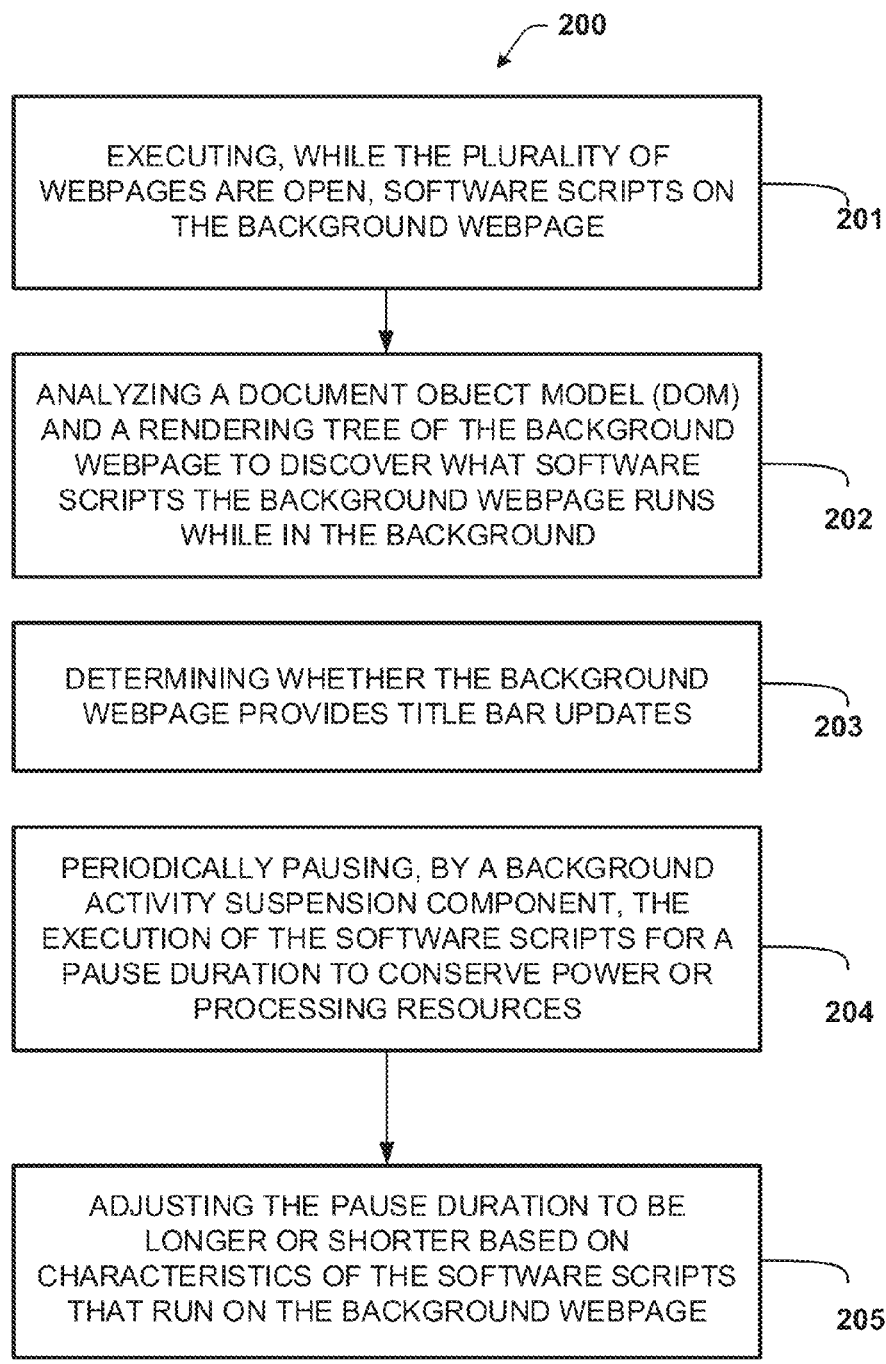
FIG. 2 is a flowchart that may be traversed to depict a method in accordance with aspects of the present disclosure.

FIG. 2 is a flowchart that may be traversed to depict a method 200 in accordance with aspects of the present disclosure. Simultaneous reference is made to components of FIGS. 1 and/or 7 that may be used to perform all or part of the method 200. An aspect of the present disclosure is a method 200 for pausing activities in an internet browser in which a plurality of webpages are open, at least one of the webpages being a background webpage relative to at least one other of the webpages. The method may first comprise, at step 201, executing (e.g., by the JavaScript engine 114, the browser core 110, or both), while the plurality of webpages are open, software scripts on the background webpage. Then, at step 202, the method may comprise analyzing a Document Object Model (DOM) and a rendering tree (e.g., at a DOM and rendering tree analyzer 732) of the background webpage to discover what software scripts the background webpage runs while in the background. The method may then include, at step 203, determining whether the background page provides title bar updates. Then, at step 204, the method 200 may comprise periodically pausing, by a background activity suspension component (e.g., at background activity suspension component 112), the execution of the software scripts for a pause duration to conserve power or processing resources. Then, at step 205, the method 200 may comprise adjusting the pause duration to be longer or shorter based on characteristics of the software scripts that run on the background webpage. Various aspects of method 200 will be described in greater detail throughout this disclosure.

Figure 3:
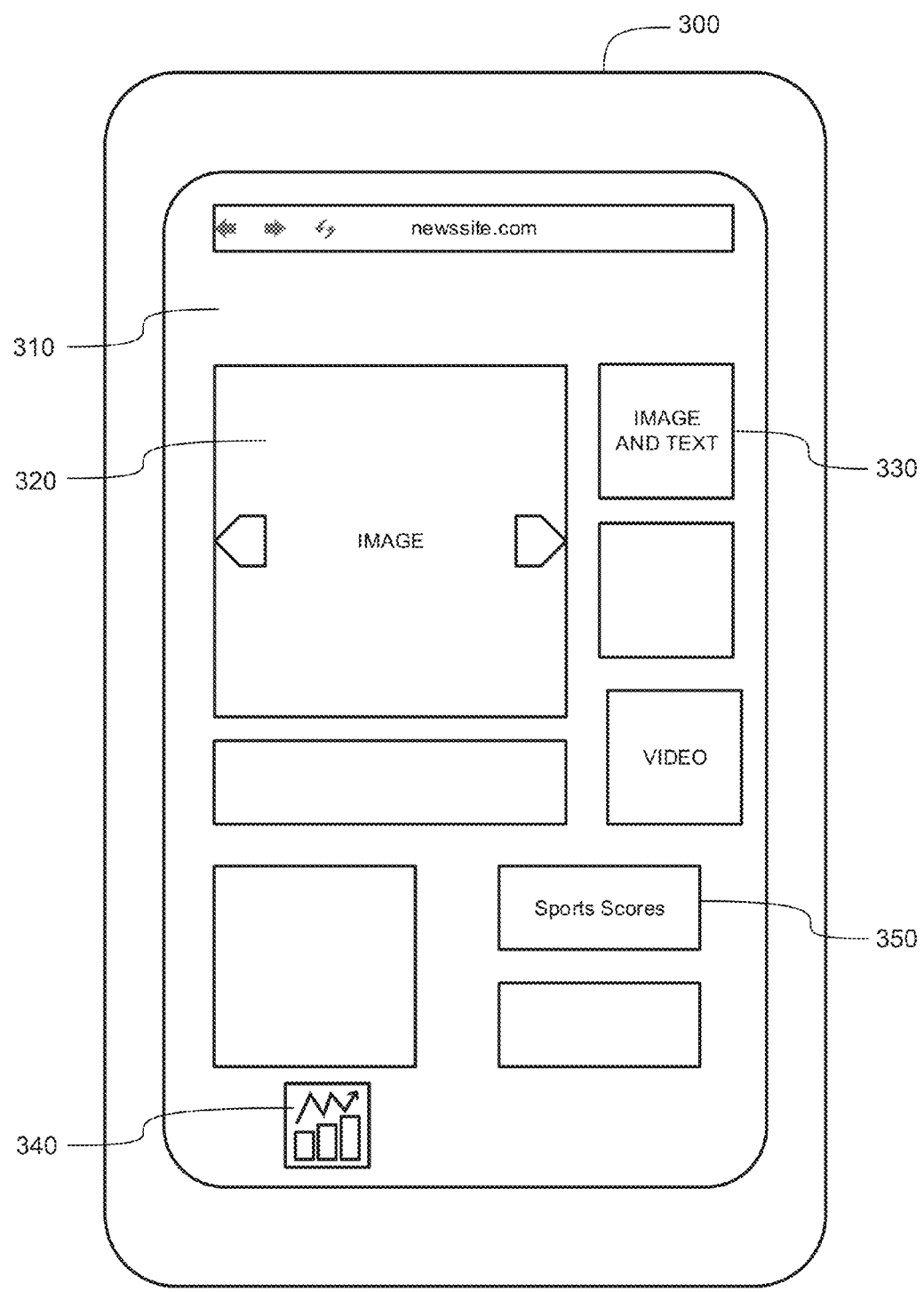
FIG. 3 is a diagram depicting a display of a website on a browser of a computing device.
Figure 6:
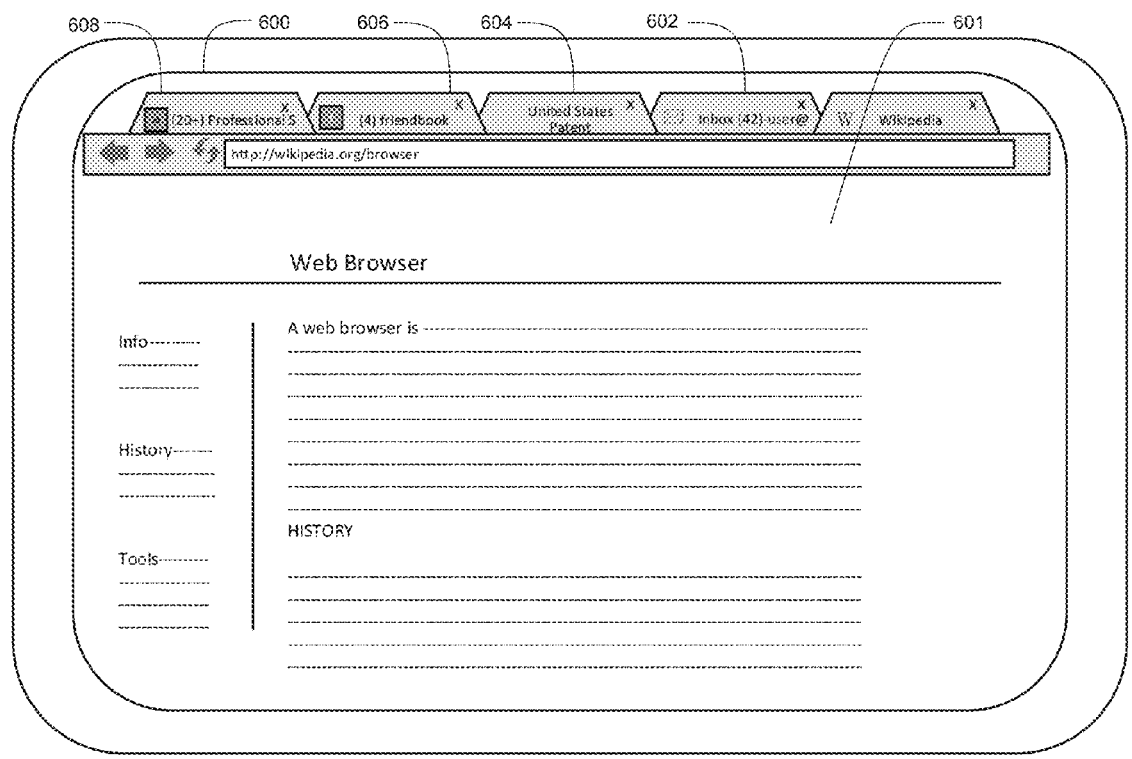
FIG. 6 is a diagram depicting a display of a main website and the title bars of background websites on a browser of a computing device.

FIG. 3 depicts a mobile computing device 300 that displays a webpage 310 from a news website. The mobile computing device 300 in this illustration may be realized by a smartphone. In many smartphone browser displays, no background tabs are visible at all when a foreground website is being viewed or interacted with by a user. That is, not even a title bar of any tabs running in the background are visible. In contrast, referring briefly to FIG. 6, computing devices with larger user interfaces, such as a desktop computer, laptop computer, or tablet, may have browser displays that show the primary site and title bars side by side for sites running in the background.

The exemplary website 310 depicted in FIG. 3 illustrates the kind of script execution that may occur on a news website, as experienced by a user. The website 310 may have banner images 320 that automatically change a displayed image representing a story every few seconds. The banner images 320 may comprise a JavaScript object, and every time the image changes, the object is executed, requiring style and layout calculations. Additionally, the website 310 may comprise static images and text 330, which may comprise an object that only needs to be rendered once, upon the loading of the site. The website 310 may also comprise a stock tracker 340 and sports scores 350, which may both comprise objects that require frequent updating, resulting in frequent JavaScript execution, and frequent style and layout rendering. The website 310 in the embodiment depicted may or may not update its title bar when it is in the background.

Throughout this disclosure, terms that are known in the art will be used to describe attributes of scripting code. Scripts may be referred to as "cheap" or "expensive," or alternatively, "light" or "heavy," which broadly refer to the relative amount or complexity of lines of scripting language code. The terms "cheap" and "expensive" may generally correspond to how much processing power (or other device resource, such as battery power or network data transmission) is necessary to execute a particular script, with an expensive script requiring more resources than a cheap script. The terms "light" and "heavy" may generally refer to the frequency of script execution on a particular page, with heavy execution being more frequent than light execution. However, the terms "cheap" and "light," and "expensive" and "heavy" may be used somewhat interchangeably.

Figure 4:
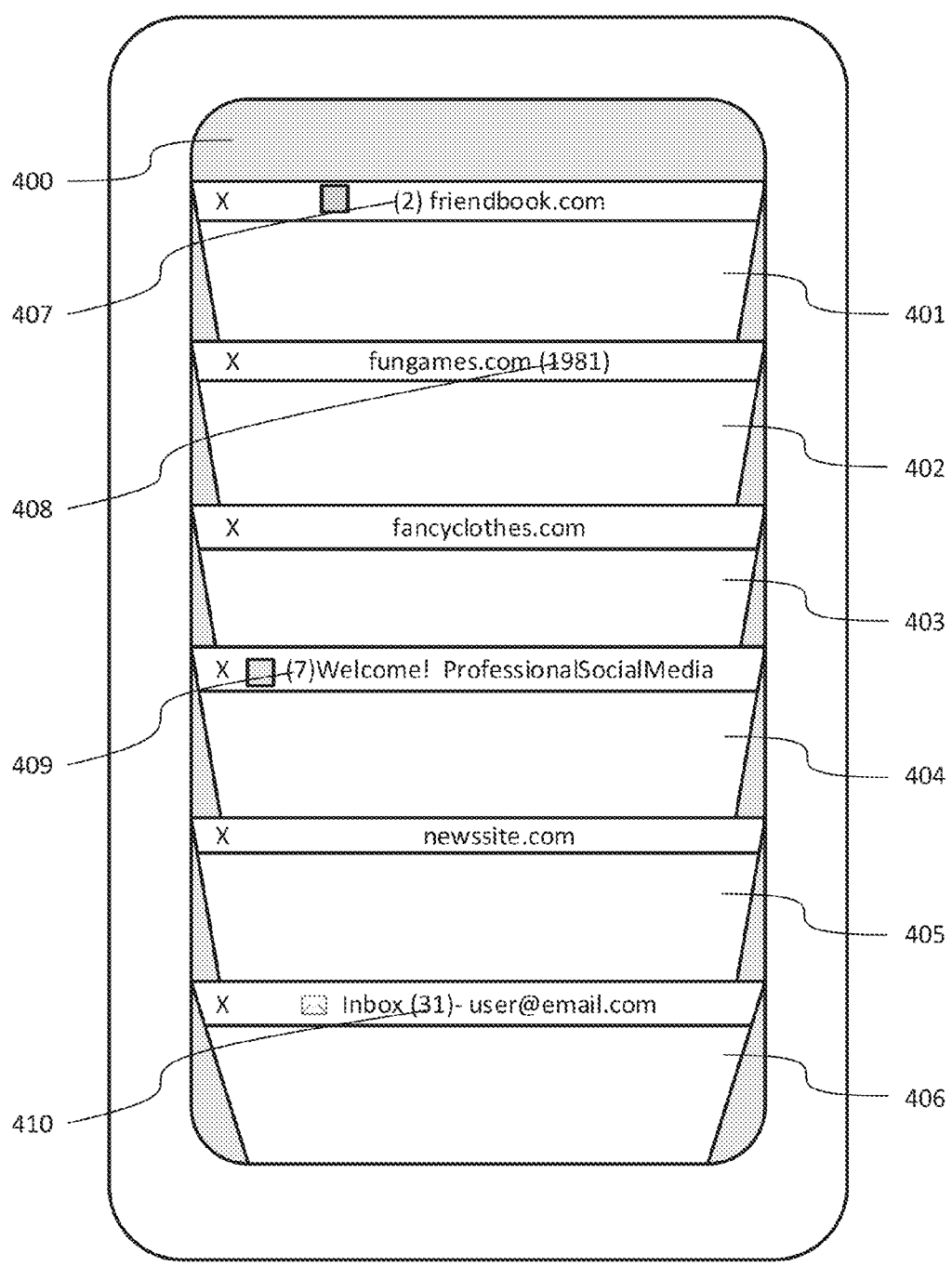
FIG. 4 is a diagram depicting a display of thumbnail images of background websites running on a browser of a computing device.
Figure 5:
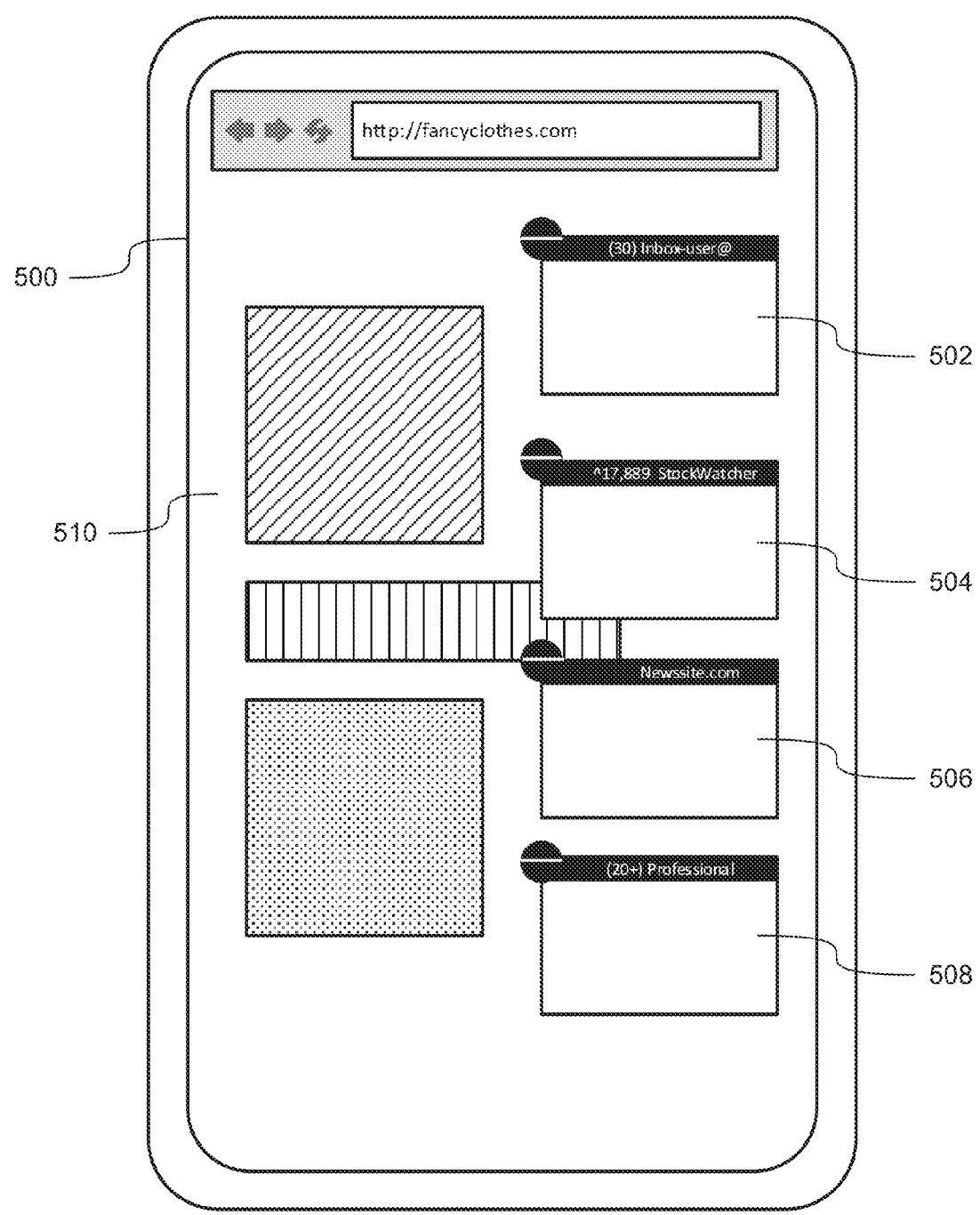
FIG. 5 is a diagram depicting a display of a main website and background thumbnail images websites running on a browser of a computing device.

FIGS. 4 and 5 show two alternate displays of websites running in the background on two different smartphone displays. The background tab display 400 of FIG. 4 shows various background tabs, including a social media site 401, a gaming website 402, a retail shopping website 403, another social media website 404, a news website 405 (similar to the news website 310 shown in FIG. 3), and an e-mail website 406. The various examples of websites are depicted to show that some websites have title bar updates and others do not, and that title bar updates can often be correlated to JavaScript execution activity. For example, websites 401, 402, 404, and 406 have title bar updates 407, 408, 409, and 410, respectively. In the examples depicted, the title bar updates 407, 408, 409, and 410 are all implemented as numbers in parentheses. It is known in the art that title bar updates are often implemented as numbers in parentheses, indicating varying types of information to a user. For example, title bar update 407 may indicate that a user has two new notifications on the social media site 401, title bar update 408 may indicate a current score on the gaming site 402, the title bar update 409 on the social media website 404 may indicate how many new items are unread in the user's feed, and the title bar update 410 may indicate how many unopened e-mails a user has on the e-mail website 406. The numerical updates are depicted in varying locations in relation to textual information on the title bars. Embodiments of the present disclosure apply to all variations of numerical updates, including those not listed herein. Such examples may include, but are not limited to, sports scores and stock trackers. Additionally, there are some kinds of title bar updates that are not numerical or alphanumerical at all. For example, some title bars may intermittently flash or glow a different color to indicate that some new information is available to the user. Embodiments of this disclosure apply to the variety of visual cues currently used and yet-to-be-implemented as title bar updates.

Still referring to FIG. 4, the background tab display 400 does not have a particular tab that is designated as a foreground tab. Instead, all the tabs are displayed equally as background tabs. In this kind of background tab display 400, there are at least three possibilities of how the execution of JavaScript activities on background tabs may occur. The first possibility is that all the tabs 401-406 may be immediately suspended upon entering this background tab display 400. That is, all the background tabs cease JavaScript execution, and therefore, also cease title bar updates. In this case, users experience a breakage in the functionality of the title bar updates, which may be undesirable. A user may want to be able to view title bar updates in a view such as the background tab display 400. The second possibility is that in background tab display 400, the most recent website that was the in the foreground may continue to execute scripts, and the other background tabs are completely suspended. When one of the background tabs is chosen as the foreground website, that site refreshes completely or resumes script execution. A third possibility is that background websites in the background tab display 400 may continue to execute scripts continuously until the device is out of memory to continue the execution. Such a case preserves the functionality of the title bar updates for when the user goes to view them, but may waste processing and memory resources and battery power. Aspects of the present disclosure contemplate periodically pausing and resuming background tab script execution in each of the aforementioned scenarios in order to preserve title tab functionality and save power.

FIG. 5 shows a background tab display 500 wherein background webpages 502, 504, 506, and 508 appear as thumbnail images with title bars, and are superimposed on a current website 510. The current webpage 510 is depicted as a retail shopping webpage that does not require ongoing script execution. That is, it may periodically receive updated content on the server side of the website (i.e., a retailer might change the images displayed on a front page every few days), but there are no scripts on the page that have functionality that allows for that updated content to be retrieved by the client's browser. For example, if the retailer happened to update the images on its server while the user had the webpage open, the webpage would not execute a script to retrieve those new images. The webpage would have to be refreshed before the user would see the new images.

The background webpages 502 and 504, depicted as an e-mail website and a financial stock website, respectively, do normally execute scripts in the background. The background websites 506 and 508 are depicted as a news site and an entertainment blog website, respectively, and also normally execute scripts when they are in the background. In the example depicted, it is contemplated that the e-mail website 502 updates somewhat frequently in order to retrieve e-mails in a timely manner. The e-mail website 502 may execute a script every second that checks the e-mail server for any new messages. This script may not be particularly heavy in terms of processing power, but it may be nonetheless wasteful. That is, if new e-mails are not received every second, but are instead received every ten seconds or more, the processing power and network transmission spent on the server check script is wasted. If no new messages are received, the display on the e-mail website 502 will not change. However, if a new message is received, the e-mail website will execute other, heavier scripts that recalculate the style and layout, in order to, for example, display a new line of text in a new color at the top of the inbox, move the older messages down, update the number of e-mails in the inbox line, update the title bar numerical indicator, etc. According to various embodiments of the present disclosure, it is contemplated that the execution of all or some of these scripts, whether cheap or expensive, may be paused periodically in order to save power and processing resources.

The background website 504, which is a financial website that receives stock updates, may execute expensive scripts quite frequently. The background website 504 may automatically check for updates and simultaneously display new stock information upon every check. During the business day, the new stock information will almost certainly change upon every check, which may result in the recalculation of style and layout for multiple charts, graphs, line items, arrow indicators, numbers, and the title bar.

Many browsers will utilize a canvas in order to perform all of the rendering in the background, other than the final painting onto the user interface. That is, if a script on the website requires the recalculation of style and layout to occur for objects on the page, the browser will perform all the recalculation even while the body of the page is not visible to the user. This rendering, which takes place on a canvas, is then used to quickly paint the newly rendered website once the user brings it to the foreground. When a script is executed that causes a background webpage to update and change the visual display to the user, the update is visible only on the title bar, but the update corresponds to a change on the body of the page. The canvas rendering is done simultaneously with the title bar update so that when the user brings the background website to the foreground, the body of the page matches the updates that were previously only seen on the title bar.

Some websites, such as the news website 506 and social media website 508 may only update the title bar and make minimal changes to the body (i.e., rendering changes on a canvas) of the website while in the background. For example, the news website 506 may execute a script to check for new content from the server every thirty seconds, and if new content is received, the website may execute a script to update the title bar with a new numerical indicator, and may execute another script to create a small button that says "click here for the latest news" (again, on the canvas while in the background) The news website 506 may execute these less expensive scripts in contrast to automatically changing the images and text for every new story update, and automatically executing scripts to recalculate style and layout for large portions of the page. Similarly, the social media website 508 may execute a script to check the server for new posts in a feed, and if new posts are available, it may execute another script to update the title bar, and may execute another script to create a small button on the body of the website that says "click here to see all new posts," rather than executing a heavy script that updates the entire layout of the page to display every new post. The news website 506 and the social media website 508 may have been developed in this manner in consideration of the processing power consumed by the client communication devices. Other websites, however, may not be developed with such consideration for the end user in mind. For example, many sites run heavily animated advertisements (sometimes with intrusive sound) even though the websites are in the background. These sites may not even provide title bar updates, but still execute heavy scripts while in the background. On the other hand, other sites may continue to execute heavy scripts because they are necessary to provide a satisfactory user experience. For example, a sports website that reports and graphically displays the play-by-play activity of a football game may necessarily update not only the title bar with a score, but also a graphical depiction (requiring style and layout calculations) of the most recent plays on the body of the page.

FIGS. 4 and 5 depict two alternative displays of current and background tabs on a smartphone browser, but aspects of this disclosure may apply to any other currently available and yet-to-be created display formats that allow for multiple website tabs to be open, and which relegate certain tabs to a background status at any point. Similarly, aspects of the present disclosure may apply to the browser display 600 of FIG. 6, which is different from the displays in FIGS. 4 and 5 in that while the current foreground website is being displayed or interacted with by the user, all of the background tabs are still visible. FIG. 4 depicts a display in which the background tabs are not visible when there is a selected foreground tab, and in which there is no selected foreground tab when the background tabs are visible. That is, the display of multiple background tabs has limited purposes; viewing the title bars of background tabs, selecting a new foreground tab, or closing tabs. FIG. 5 depicts a display in which a foreground tab is still visible and prominent while background tabs are presented to the user, but the foreground tab is not fully functional. That is, the background tab display 500 is also primarily for the purposes of viewing the title bars of the background tabs, selecting a new foreground tab, or closing tabs. In contrast, the browser display 600 of FIG. 6 allows the user to fully view and interact with the foreground tab 601 while displaying the functional title bars of the background websites. The browser display 600 may be commonly associated with desktop, laptop, or tablet computers, but may also be found on smartphones and other mobile computing devices.

In order to save power consumption, memory, and processing power, especially on mobile computing devices, an aspect of the present disclosure is that the execution of scripts on background tabs may be paused based on several factors. The pauses may cause the execution of scripts to occur with a different frequency than the default frequency dictated by the website. The pauses may vary in duration and dynamically increase or decrease over time.

Figure 7:
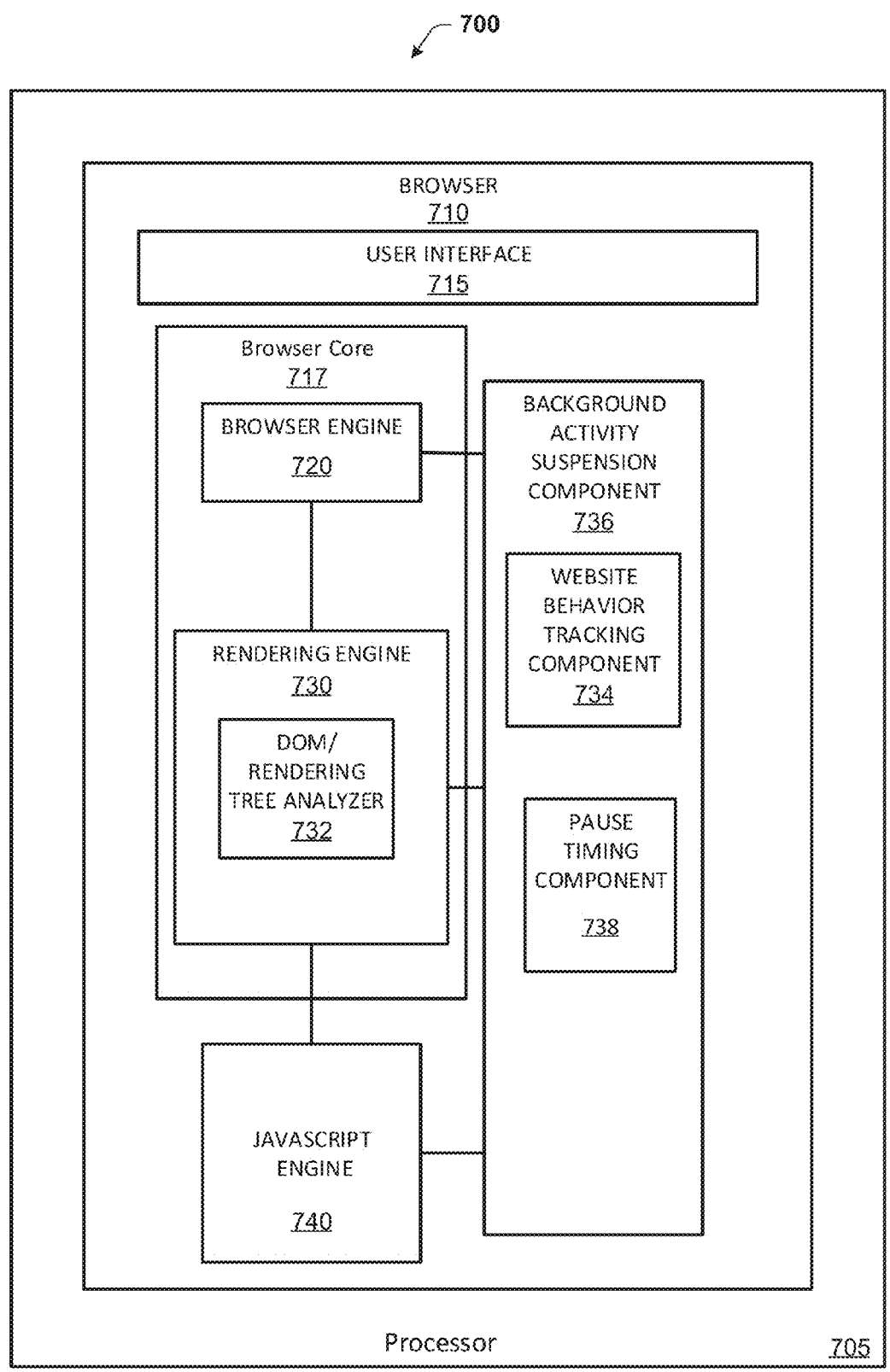
FIG. 7 is a functional block diagram depicting components of a browser that may implement aspects of the disclosure

Turning now to FIG. 7, shown is a logical diagram of components that may implement aspects of the disclosure. Computing device 700 has one or more processors 705 on which a browser 710 is implemented. The browser 710 comprises a user interface 715, on which the browser 710 is displayed, and which interacts with various components of the browser 710. The browser 710 additionally comprises a browser core 717 that is itself comprised of a browser engine 720 and a rendering engine 730, and a JavaScript Engine 740. Some browsers may have multiple rendering engines (not depicted here), one for each open tab. The browser 710 may additionally comprise a background activity suspension component 736, which may be logically connected to the JavaScript Engine 740 and the rendering engine 730, because the background activity suspension component 736 may instruct the JavaScript Engine 740 to pause the execution of scripts, and/or it may instruct the rendering engine 730 to pause the execution of scripts from the JavaScript Engine 740, or alternatively, from another client-side scripting language component or plug-in (not depicted).

The background activity suspension component may have a pause timing component 738. It is contemplated that the pause timing component 738 may instruct the background activity suspension component 736 regarding how long to pause the execution of scripts on various background websites. Though the pause timing component 738 is depicted here as a separate component from the browser engine 720, they are logically connected. In fact, many browser engines have timing capabilities to execute scripts after a certain delay, or timeout. In some embodiments, the pause timing component 738 within the browser engine 720 is an existing component of the browser engine 720, and may be utilized or modified to dynamically adjust the pause duration in accordance with this disclosure.

The pause timing component 738 may have a default time based on which it pauses all background script execution initially (e.g., upon a website becoming a background website). This initial default time may be based on the processor manufacturer's default settings, or the browser's default settings, for example. It may be based on empirical evidence gathered from popular websites regarding how often certain script executions take place, and how expensive or heavy common scripts are. In some embodiments, the pause timing component 738 may keep the pauses the length of the default time. For example, the pause timing component 738 may have a default time of ten seconds during which all script execution is paused for a background tab, then one second during which script execution may resume, then another ten seconds during which it is paused. This pause timing may continue indefinitely until the user brings the particular background page to the foreground, at which time all script execution on that page may be resumed without pauses.

In other embodiments, the pause timer component 738 may dynamically adjust the duration of the pause based on several factors. Some of the factors relate to conserving resources of the device, such as processing power, battery power, data transfer, and network bandwidth. Other factors relate to the performance characteristics of a background tab as desired by a user, such as how quickly an updated page appears to load once it is brought to the foreground, and how timely the updates in a background title bar are received. One of the factors that may determine whether, and for how long script execution should be paused for a background tab is whether the background title bar is even visible to the user while a foreground tab is being used. For example, in FIG. 4, the background title bars are not visible to the user while the foreground tab is being used, and therefore the pause timing component 738 may increase the time of the pause. If the default time was initially ten seconds, the pause timing component 738 in an embodiment implemented with FIG. 4 might aggressively increase the pause duration to a minute or more. It is possible that the pause timing component 738 may increase the pause duration to correspond with the duration the tabs are in the background and then resume background script execution once the background tabs become visible. That is, the background script execution might only be resumed once the user chooses to view all the background tabs, and at that time, all the title bars would update so the user could receive any desired information. However, there may be cases in which such an aggressive pause might cause performance issues. For example, if several background websites that normally receive frequent updates and rendering changes via script execution are paused for several minutes or hours, and then all of them were to be resumed at the same time, the processing power necessary to perform all the necessary updates might result in unsatisfactorily slow performance of delivering the updates. This is one example of when the performance characteristics, such as perceived speed and responsiveness of page loading, may be considered as factors for how long the pause duration should be. For such situations where processing power may be a concern, some embodiments allow the pause timing component 738 to aggressively pause script execution, but may allow script execution to resume several times while the background tabs are in the background. For example, the background tabs 401-406 in FIG. 4 may all be in the background for five minutes, and during that time, they may be (somewhat aggressively) paused for one minute at a time, then resume updates for one second. During the five-minute time period, the background activities would have been paused for the majority of the time, but still updated five times.

In situations where the background tabs are more likely to be accessed by a user, the pause timing component 738 may pause script execution less aggressively. For example, in FIG. 5, the background tab display 500 may represent a format wherein a user is accustomed to checking background title bar updates for information while still using the foreground page. This is another example of how the performance characteristics of a webpage, such as the frequency with which updates are delivered, may be a factor in how long the pause duration should be. Features of the display 500 may make it easier for a user to check background title bar updates more often than on the background tab display 400 of FIG. 4. In such an embodiment, a pause timing component 738 in conjunction with the display 500 of FIG. 5 may pause background script execution every 15 or 30 seconds, rather than a minute, as an example.

In displays where the background tabs are always visible to a user while the foreground tab is being used, the pause timer component 738 may not necessarily increase the pause duration from the default setting. For example, in the browser display 600 of FIG. 6, the title bars of background tabs 602, 606, and 608 get updated, and because they are visible, a user might notice if the background scripts are paused too aggressively.

Another set of factors that determines how long the pause timer component 738 pauses script execution may be attributes of the website itself. These attributes can be analyzed by a website behavior tracking component 734 and/or a DOM and rendering tree analyzer 732. These may be discrete components, or may be implemented as a single component. The DOM/rendering tree analyzer 732 is depicted as a component of the rendering engine 730, because it is known in the art that a rendering engine constructs DOM trees and rendering trees. The "analyzer" component 732 collects information regarding the nature of scripts detected within the DOM tree and rendering tree, and that information is used by the background activity suspension component 736 and the pause timing component 738 to help determine whether and how to adjust the pause duration. The portion of the DOM/rendering tree analyzer 732 that analyzes the DOM may be able to detect if there are any objects that require client-side execution of scripts (JavaScript or otherwise), just from the nature of the object in the DOM. However, sometimes an object will contain a JavaScript portion, but it will not be apparent from just analyzing the DOM. Therefore, the rendering tree is also analyzed. The portion of the DOM/rendering tree analyzer 732 that analyzes the rendering tree can detect any JavaScript (or other) code within various objects in the DOM tree. The DOM/rendering tree analyzer 732 may collect information such as how many scripts exist in the HTML document, how frequently they occur, and how processing-heavy those objects may be to run each time.

While much useful information can be obtained from the DOM/rendering tree analyzer 732 upon the initial loading of the page, other attributes of a website may only become known over time. The website behavior tracking component 732 can gather information about websites over time that can be used to adjust the pause timer. Such information can include how often a particularly heavy script is actually executed.

In some embodiments, the DOM/rendering tree analyzer 732 may only analyze the contents of the DOM and rendering trees once, such as upon the initial loading of a webpage when the user loads it as a foreground page. It is likely that all the scripts that could possibly be executed on the page would be detectable upon the initial construction of the DOM and rendering trees, whether the particular scripts are run while the page is in the foreground or the background. In other embodiments, the DOM/rendering tree analyzer 732 may only analyze the contents of the DOM and rendering trees once the webpage becomes a background page. The embodiments described herein may be implemented in the manner that conserves the most power depending on the particular application.

It is contemplated that the website behavior tracking component 734 may begin to track the behavior of a particular website once it has been sent to the background, because the determination of how long to pause activities is primarily dependent on how a website behaves when it is in the background. The website behavior tracking component 734 may track and calculate, among other things, how often JavaScript scripts are executed and how long or complex they are.

In addition to JavaScript scripts, and other client-side scripting language scripts, there are other sections of code in various languages that comprise APIs, HTML, and CSS that may run when a website is in the background that consume resources. In order to optimize the user experience in certain embodiments, some of these APIs and other features may alternatively be paused or allowed to run while in the background, depending on the instructions of the background activity suspension component 736. For example, one popular API for playing substantial audio content is WebAudio. Websites utilizing WebAudio typically have built-in rules for whether the audio will continue to run if the website is in the background of the browser. If the audio is integral to the purpose of the website, (e.g., the website plays streaming radio stations or podcasts), the WebAudio will usually continue playing in the background. It is contemplated that in many embodiments of the present disclosure, the background activity suspension component 736 will allow the WebAudio to continue to play, and not pause it. However, there may be instances in which the DOM/rendering tree analyzer 732 may recognize that a WebAudio clip is used to play an advertisement in the background. Since such advertisements are usually undesirable to the user and not critical to the desired content of the website, the background activity suspension component may pause such activity.

In contrast, sometimes audio content that is less critical to the user experience plays through HTML <audio> tags, and that content may be paused by the background activity suspension component 736. For example, a simple animation or advertisement may have an associated sound that plays through an <audio> tag. In many embodiments, the background activity suspension component 736 will pause an HTML <audio> tag when a website is in the background, in order to conserve resources.

Many websites play videos and rich animations through Adobe Flash or other video and animation players, and those players automatically stop playing when the site is pushed to the background, because the primary purpose of that content is to be visually displayed. It is contemplated that when a website has a heavy API (such as WebAudio) that continues to run, the background activity suspension component 736 can still pause other scripts (such as JavaScripts) on the same website in order to conserve some processing resources. Alternatively, when a website has a heavy API or media player (such as Adobe Flash) that automatically suspends when in the background, the background activity suspension component 736 can detect any other additional scripts (such as JavaScripts) and pause them.

Additionally, as various scripting languages evolve, it is contemplated that embodiments of the invention will be able to dynamically pause any type of script that consumes processing power, network bandwidth, battery power, or data transfer. For example, though JavaScripts are most ubiquitous now for executing dynamic website functions, many features of HTML5 and later versions and CSS3 and later versions may become more commonly used to execute dynamic website features. It is also contemplated that embodiments of the background activity suspension component 736 may determine which scripts to pause based on subjective assessments of the value of scripts, with such assessments being programmed into the algorithms of the background activity suspension component 736. For example, in the past, certain HTML tags were created and then supported on most web browsers, but then fell out of favor with users and developers and eventually became classified as non-conforming to HTML standards and unsupported by web browsers. Examples of such tags include the much-derided <blink> and <marquee> HTML tags. It is possible that in the future, other tags or scripts may be created in various scripting, markup, or style sheet languages, and may be supported for a period of time by existing web browsers. However, some such tags or scripts may be determined to be expensive or heavy to run in a background tab, especially in relation to their value to the user. Therefore, it may desirable for implementations of the present disclosure to identify undesirable tags and scripts and pause them very aggressively. Such a feature could provide the advantage of saving power by pausing undesirable scripts or tags, even if they are still supported by browsers.

Another aspect of the disclosure is that when there are multiple background tabs open, the pause duration may not be the same for all tabs but may vary from one tab to other (e.g., depending on each tab's content pattern). As described earlier, the duration of the pauses, and whether they are increased, decreased, or stay the same over time, will be determined by an algorithm based on factors including how much script execution occurs on a website when it is in the background, whether a title bar appears to a user when a website is in the background, whether it has title bar updates, the relationship of the script execution to the title bar updates, the relative value of the title bar updates to the amount of script execution, and other variables discussed throughout this disclosure.

Figure 8:
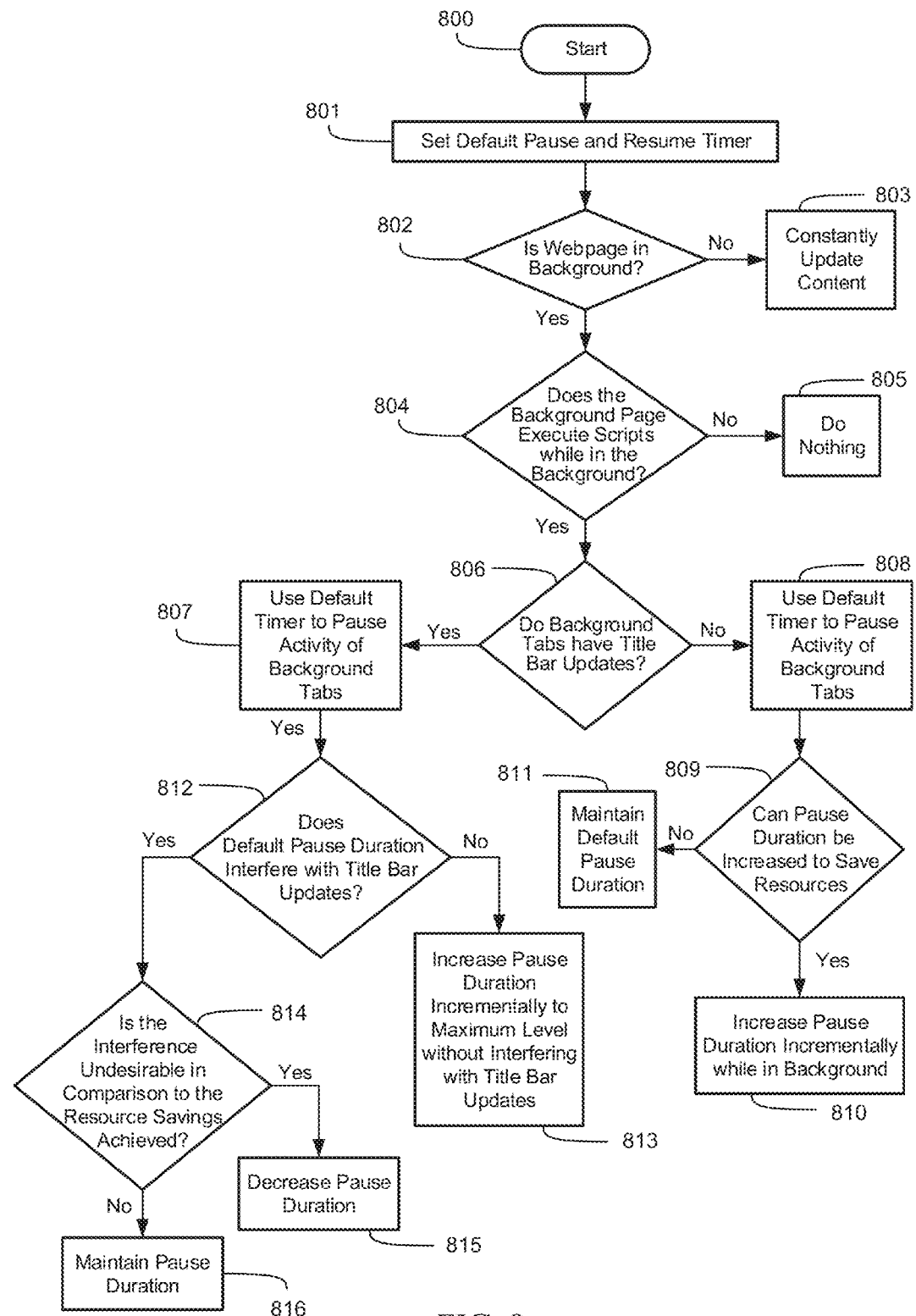
FIG. 8 is a flowchart that may be traversed to depict methods in accordance with aspects of the disclosure.

FIG. 8 is a flowchart 800 depicting one embodiment of how the browser 710, and particularly the background activity suspension component 736 could adjust the pause duration as they receive information about the background tabs from other components. It should be noted that the flowchart in FIG. 8 is exemplary only, and in other embodiments, certain steps may be omitted, or other steps may be added while still being within the scope of the present disclosure. First, the default pause and resume timer may be set at 801, by, for example, the pause timing component 738. Then, the browser 710 may detect whether a webpage is in the background in relation to another webpage at 802. If a webpage is not in the background, the browser 710 may constantly update content at 803, meaning that all normal software scripts and activities will be run normally. If webpage is in the background, then the browser 710 may determine whether the background page executes scripts while it is in the background at 804. This determination at 804 may be made by the DOM/rendering tree analyzer 732. Additionally or alternatively, this determination at 804 may be made by the website behavior tracking component 734. If the background tab does not execute any scripts while in the background, the browser 710 does not need to do anything, as shown at 805, because no unnecessary resources are being consumed by the background page.

If, however, the background pages do execute scripts while in the background, then the browser 710 may make another determination, which is whether the background tabs provide any title bar updates, at 806. Additionally, the determination at 806 may also include whether the background page(s) are visible at all to a user, though this aspect is not depicted in this flowchart. The determination at 806 of whether background tabs have title bar updates may be made, for example, by the DOM/rendering tree analyzer 732. Whether or not the background tabs provide title bar updates, the background activity suspension component 736 will utilize the pause timing component 738 to pause the background activity for a default period of time (i.e., pause duration) at 807 and 808. This determination at 806 may be made several times during an internet browsing session, during instances where there are multiple background tabs, some of which have title bar updates and some of which do not.

If a particular background tab does not have a title bar update, then further determinations may be made in order to maximize resource savings. For example, at 809, the website behavior tracking component 734 may determine whether pause duration can be increased to save resources. In various embodiments, multiple factors may be included in making this determination. For example, although background script execution may be very heavy, the presence of few or no title bar updates may weigh in favor of increasing the pause duration to save more resources (e.g., power and processing resources) because the performance of the background page may be maintained (as perceived by the user) at the increased pause duration. In contrast, frequent, heavy script execution in the background may weigh in favor of maintaining a low pause duration because the heavy script execution is necessary to provide content that the user expects to see when the user eventually brings the tab to the foreground. That is, in some instances there may be a beneficial use for the heavy script execution. Therefore, in some embodiments, the determination at 809 of whether the pause duration can be increased to save resources may be weighed against other aspects of the webpage. In some of these embodiments, the determination at 809 may lead to a decision to maintain the default pause duration at 811. These determinations at 809 may be performed by various implementations of the website behavior tracking component 734. In many embodiments, though, pause duration can be increased to save resources. In those cases, the background activity suspension component 736 may increase the pause duration associated with a particular webpage incrementally while the particular webpage is in the background at 810.

It is contemplated that an "incremental" increase in pause duration may take various forms. For example, if the default pause duration is ten seconds, then the pause duration may be increased first to twenty seconds, next to thirty seconds, then to forty seconds, and so on. As another example, the pause duration may increase by doubling the pause duration every time the pause duration is adjusted, such as by first adjusting the pause duration from ten seconds to twenty seconds, next to forty seconds, then to eighty seconds, and so on. It is contemplated that there may be a maximum pause duration (not shown in FIG. 8) in order to preserve the functionality of background websites. That is, in some embodiments, the pause duration may not be increased incrementally to prevent the pause duration from being so long that the pause duration renders the user's perception of the background webpage indistinguishable from a background webpage that has been completely suspended or killed.

If a background tab is determined to have title bar updates at 806, then the background activity suspension component 736 can also utilize the pause timing component 738 to implement a default pause duration at 807. Then, the website behavior tracking component 734 can determine whether the default pause duration interferes with title bar updates at 812. In cases where the default pause duration does not interfere with title bar updates (for example, title bar updates are very infrequent, or coincide closely with the update intervals allowed by the default pause duration), then the background activity suspension component 736 may incrementally increase the pause duration to a maximum level that does not interfere with title bar updates at 813. For example, at 813, the background activity suspension component 736 may increase the pause duration from ten seconds to twenty seconds without interfering significantly with title bar updates. However, the website behavior tracking component 734 may detect that when the pause duration is increased to thirty seconds, the pause interferes significantly with the normal title bar updates. In such a scenario, the pause duration may be adjusted back down to twenty seconds, and remain there indefinitely.

It is contemplated that in many embodiments, the default pause duration may interfere with title bar updates very slightly in comparison to how often title bar updates would be received if the background script execution was not paused. For example, in the case of an e-mail website, the normal background script execution might send a server check request every second and update the title bar within that one second if an e-mail is received. However, in embodiments of the present disclosure, the background script execution may be paused for ten seconds at a time. In an example where an e-mail is received one minute and five seconds after going to the background, the title bar update would normally be received by the user at one minute and five seconds. But when the background tab is paused for ten seconds at a time, that title bar update might not be received until approximately one minute and ten seconds (i.e., five seconds after it was actually received). This five-second delay might not be undesirable to the user; the user likely would not know the difference. But by implementing a pause of the background activity, the browser might have saved resources on 60 or more individual script executions.

For other types of websites with more frequent title bar updates, the user might notice the delay, and the less frequent title bar updates might be undesirable. These types of determinations are made at 814. It can be appreciated that a number of factors may go into this determination, and that various embodiments may take combinations of these factors into account to determine what constitutes "undesirable" interference. These factors may be implemented as thresholds. For example, thresholds can be numbers of milliamps consumed by a website, number of scripts executed in a period of time, or some other kind of quantifiable measure. Other thresholds may include statistical data received from a network (e.g., the internet) about how users of a particular website typically interact with it. Other factors can include the type of website, or historical information about how the user of the computing device itself typically interacts with various websites. Many embodiments of the determination at 814 may be implemented. In general, if the interference is determined to be undesirable, then the pause duration may be decreased at 815. If the interference is not undesirable, or otherwise determined to be worthwhile in comparison to the resource savings, the default pause duration may be maintained at 816. Additionally, though not depicted, the pause duration may be otherwise adjusted (e.g., incrementally upward until some point, then decreased, such as in 810) on an ongoing basis, depending on ongoing tracking by the website behavior tracking component 734.

Figure 9:
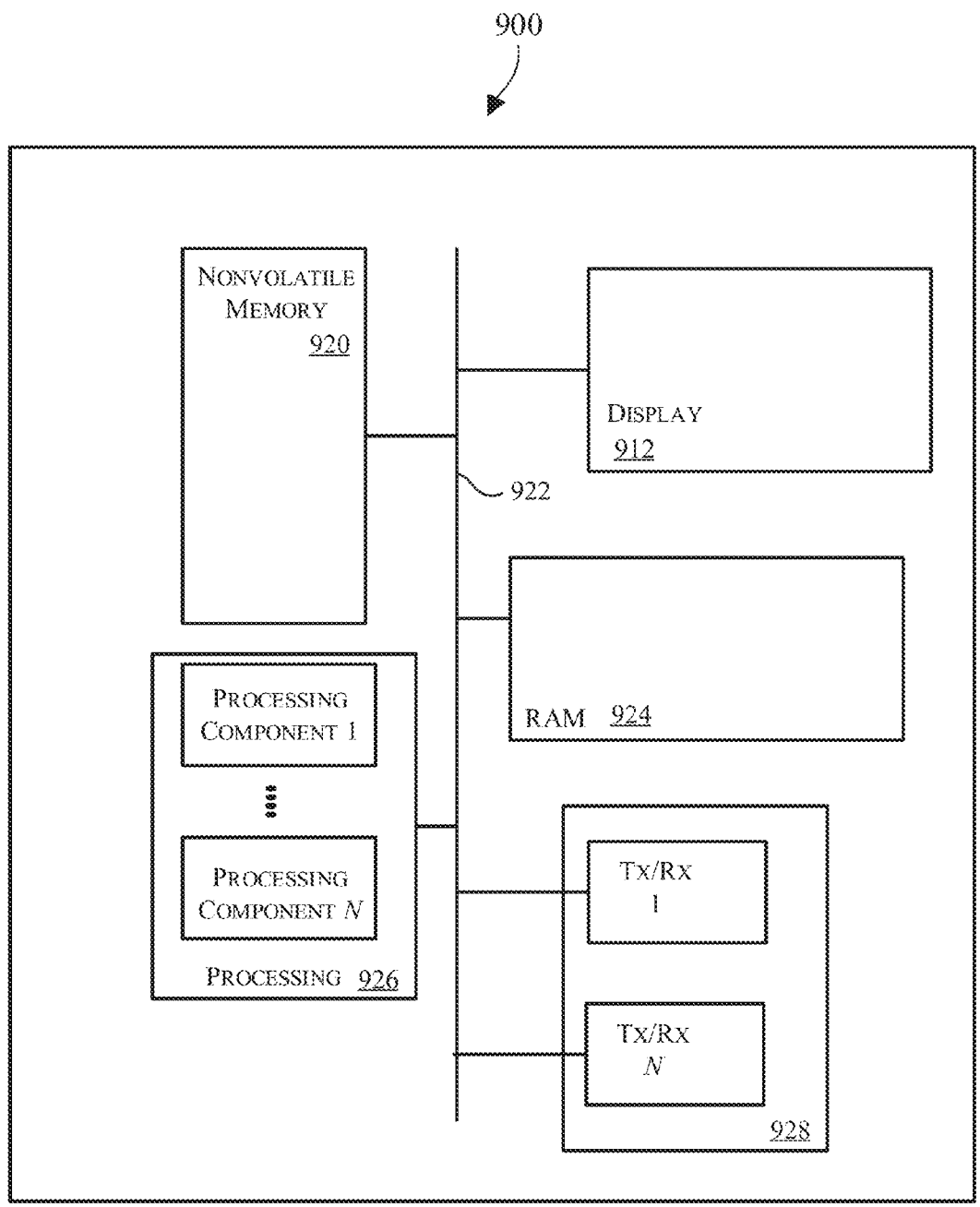
FIG. 9 is a functional block diagram of hardware components that may implement aspects of the disclosure.

Referring next to FIG. 9, shown is a block diagram depicting physical components of an exemplary communication device 900 that may be utilized to realize the communication device 100 described with reference to FIG. 1. As shown, the communication device 900 in this embodiment includes a display 912, and nonvolatile memory 920 that are coupled to a bus 922 that is also coupled to random access memory ("RAM") 924, N processing components 926, and a transceiver component 928 that includes N transceivers. Although the components depicted in FIG. 9 represent physical components, FIG. 9 is not intended to be a hardware diagram; thus many of the components depicted in FIG. 9 may be realized by common constructs or distributed among additional physical components. Moreover, it is certainly contemplated that other existing and yet-to-be developed physical components and architectures may be utilized to implement the functional components described with reference to FIG. 9.

The display 912 generally operates to provide a presentation of content (e.g., webpage content) to a user, and may be realized by any of a variety of displays (e.g., CRT, LCD, HDMI, micro-projector and OLED displays). And in general, the nonvolatile memory 920 functions to store (e.g., persistently store) data and executable code including code that is associated with the functional components depicted in FIG. 1. In some embodiments for example, the nonvolatile memory 920 includes bootloader code, modem software, operating system code, file system code, and code to facilitate the implementation of one or more portions of the browser 104, browser core 110, the background activity suspension component 112, and the JavaScript engine 114 discussed in connection with FIG. 1 as well as other components well known to those of ordinary skill in the art that are not depicted nor described in connection with FIG. 1 for simplicity.

In many implementations, the nonvolatile memory 920 is realized by flash memory (e.g., NAND or ONENAND™ memory), but it is certainly contemplated that other memory types may be utilized as well. Although it may be possible to execute the code from the nonvolatile memory 920, the executable code in the nonvolatile memory 920 is typically loaded into RAM 924 and executed by one or more of the N processing components 926.

The N processing components 926 in connection with RAM 924 generally operate to execute the instructions stored in nonvolatile memory 920 to effectuate the functional components such as the browser 104 depicted in FIG. 1. As one of ordinarily skill in the art will appreciate, the N processing components 926 may include an application processor, a video processor, modem processor, DSP, graphics processing unit (GPU), and other processing components.

The transceiver component 928 includes N transceiver chains, which may be used for communicating with the network 102 described with reference to FIG. 1. Each of the N transceiver chains may represent a transceiver associated with a particular communication scheme. For example, each transceiver may correspond to protocols that are specific to local area networks, cellular networks (e.g., a CDMA network, a GPRS network, a UMTS network), and other types of communication networks.

While the foregoing disclosure discusses illustrative aspects, it should be noted that various changes and modifications could be made herein without departing from the scope of the described aspects as defined by the appended claims. Furthermore, although elements of the described aspect and/or aspects may be described or claimed in the singular, the plural is contemplated unless limitation to the singular is explicitly stated. Additionally, all or a portion of any aspect and/or aspects may be utilized with all or a portion of any other aspect and/or aspects, unless stated otherwise.

What is claimed is:

1. A method for pausing activities in an internet browser in which a plurality of webpages are open, at least one of the webpages being a background webpage relative to at least one other of the webpages, the method comprising:
   executing, while the plurality of webpages are open, software scripts on the background webpage,
   analyzing a Document Object Model (DOM) and a rendering tree of the background webpage to discover what software scripts the background webpage runs while in the background,
   determining that the background webpage provides title bar updates,
   determining how frequently the background webpage provides title bar updates,
   periodically pausing, by a background activity suspension component, the execution of software scripts related to the title bar updates for a pause duration to conserve power or processing resources, and
   determining whether the pause duration interferes with the title bar updates,
   dynamically adjusting, if the pause duration does not interfere with the title bar updates, the pause duration to incrementally increase over time to a maximum duration, else, if the pause duration does interfere with the title bar updates, reducing the pause duration to a non-interfering duration of time and maintaining it there.

2. The method of claim 1, further comprising:
   tracking activity of the execution of the software scripts related to the title bar updates on the background webpage over a period of time to determine the amount of resources the activity consumes, and wherein
   dynamically adjusting the pause duration includes adjusting the pause duration based on the amount of resources the activity consumes.

3. The method of claim 1, wherein the software scripts include scripts written in a dynamic scripting language.

4. The method of claim 1, wherein there are at least two background webpages, and the pause duration for each of the background webpages is different from at least one other background webpage.

5. The method of claim 1, further comprising:
   receiving usage data from a third-party usage tracking website about how a particular website that provides the background webpage is used by a plurality of the particular website's users, and wherein:
   dynamically adjusting the pause duration includes adjusting the pause duration based on the usage data.

6. The method of claim 1, further comprising:
   determining, when the pause duration does interfere with the title bar updates, whether the interference is undesirable in comparison to the power or processing resources conserved, and
   decreasing the pause duration when the interference is undesirable.

7. A computing device, comprising:
   a transceiver to request and receive webpages via a network;
   a user-viewable display to present content from the webpages to a user;
   an internet browser that supports a plurality of open webpages at a time, the internet browser comprising:
      a DOM and rendering tree analyzer that determines that the background pages actively execute scripts and determines that a title bar provides updates,
      a background activity suspension component to periodically pause, the execution of software scripts related to the title bar updates on background webpages for a pause duration to conserve computing device resources; and further configured to:
    determine whether the pause duration interferes with the title bar updates,
    a pause timing component to dynamically adjust, if the pause duration does not interfere with the title bar updates, the pause duration to incrementally increase over time to a maximum duration, else, if the pause duration does interfere with the title bar updates, reduce the pause duration to a non-interfering duration of time and maintain it there.

8. The computing device of claim 7, further comprising a dynamic scripting language execution engine for executing software scripts in background webpages that are paused by the background activity suspension component.

9. The computing device of claim 7, further comprising:
    a website behavior tracking component that tracks the execution of scripts related to the title bar updates in each of the background webpages over time, and wherein the pause duration is adjusted based on the tracking to conserve computing device resources and to achieve performance characteristics of the background webpages.

10. The computing device of claim 7, wherein the pause timing component adjusts the pause duration of one background page to be a different length than the pause duration of another background page.

11. The computing device of claim 7, wherein the background activity suspension component receives usage data from a third-party usage tracking website about how a particular website that provides the background webpage is used by a plurality of the particular website's users, and wherein the pause timing component dynamically adjusts the pause duration based on the usage data.

12. The computing device of claim 7, wherein the pause timing component is further configured to:
    determine, when the pause duration does interfere with the title bar updates, whether the interference is undesirable in comparison to the power or processing resources conserved, and
    decrease the pause duration when the interference is undesirable.

13. A non-transitory, tangible, computer readable storage medium, encoded with processor readable instructions to perform a method for pausing activities in an internet browser in which a plurality of webpages are open, at least one of the webpages being a background webpage relative to at least one other of the webpages, the method comprising:
    executing, while the plurality of webpages are open, software scripts on the background webpage,
    analyzing a Document Object Model (DOM) and a rendering tree of the background webpage to discover what software scripts the background webpage runs while in the background,
    determining that the background webpage provides title bar updates,
    determining how frequently the background webpage provides title bar updates,
    periodically pausing, by a background activity suspension component, the execution of the software scripts related to the title bar updates for a pause duration to conserve power or processing resources, and
    determining whether the pause duration interferes with the title bar updates,
    dynamically adjusting, if the pause duration does not interfere with the title bar updates, the pause duration to incrementally increase over time to a maximum duration, else, if the pause duration does interfere with the title bar updates, reducing the pause duration to a non-interfering duration of time and maintaining it there.

14. The non-transitory, tangible computer readable storage medium of claim 13, encoded with processor readable instructions to perform a method further comprising:
    tracking activity of the execution of the software scripts related to the title bar updates on the background webpage over a period of time to determine the amount of resources the activity consumes, and wherein
    dynamically adjusting the pause duration includes adjusting the pause duration based on the amount of resources the activity consumes.

15. The non-transitory, tangible computer readable storage medium of claim 13, encoded with processor readable instructions to perform a method wherein the software scripts include scripts written in a dynamic scripting language.

16. The non-transitory, tangible computer readable storage medium of claim 13, encoded with processor readable instructions to perform a method wherein there are at least two background webpages, and the pause duration for each of the background pages is different from at least one other background webpage.

17. The non-transitory, tangible computer readable storage medium of claim 13, encoded with processor readable instructions to perform a method further comprising:
    receiving usage data from a third-party usage tracking website about how a particular website that provides the background webpage is used by a plurality of the particular website's users, and wherein
    dynamically adjusting the pause duration includes adjusting the pause duration based on the usage data.

18. The non-transitory, tangible computer readable storage medium of claim 13, wherein the method further comprises:
    determining, when the pause duration does interfere with the title bar updates, whether the interference is undesirable in comparison to the power or processing resources conserved, and
    decreasing the pause duration when the interference is undesirable.

\* \* \* \* \*